US008687309B2

(12) United States Patent
Mabuchi et al.

(10) Patent No.: US 8,687,309 B2
(45) Date of Patent: Apr. 1, 2014

(54) MAGNETIC RECORDING MEDIA AND MAGNETIC RECORDING SYSTEM

(75) Inventors: Katsumi Mabuchi, Hitachi (JP); Kyoko Honbo, Hitachinaka (JP); Mina Amo, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 224 days.

(21) Appl. No.: 13/178,544

(22) Filed: Jul. 8, 2011

(65) Prior Publication Data

US 2012/0008228 A1   Jan. 12, 2012

(30) Foreign Application Priority Data

Jul. 9, 2010   (JP) .................................. 2010-156964

(51) Int. Cl.
*G11B 5/02* (2006.01)
(52) U.S. Cl.
USPC ................ 360/55; 360/39; 360/131; 360/135
(58) Field of Classification Search
None
See application file for complete search history.

(56) References Cited

U.S. PATENT DOCUMENTS

| 2002/0135939 | A1 | 9/2002 | Wada |
| 2006/0183004 | A1 | 8/2006 | Hattori et al. |
| 2007/0153419 | A1 | 7/2007 | Arai et al. |
| 2009/0239099 | A1* | 9/2009 | Watanabe et al. ............. 428/826 |

FOREIGN PATENT DOCUMENTS

| JP | 63-171422 | 7/1988 |
| JP | 07-085406 | 3/1995 |
| JP | 3286291 | 3/2002 |
| JP | 2005-259300 | 9/2005 |
| JP | 2006/120222 | 5/2006 |
| JP | 2006-202374 | 8/2006 |
| JP | 2006-228282 | 8/2006 |
| JP | 2007-184019 | 7/2007 |

OTHER PUBLICATIONS

Japanese Official Action dated Jan. 7, 2014, for JP Application No. 2011-148321.

* cited by examiner

*Primary Examiner* — Muhammad N Edun
(74) *Attorney, Agent, or Firm* — Antonelli, Terry, Stout & Kraus, LLP.

(57) ABSTRACT

This invention provides a magnetic recording medium excellent in terms of corrosion resistance. The magnetic recording medium comprises a magnetic recording layer, a protective layer and a lubricant layer provided on a nonmagnetic substrate, and the lubricant layer comprises a compound having a heterocyclic ring.

17 Claims, 4 Drawing Sheets

MAGNETIC RECORDING MEDIA AND MAGNETIC RECORDING SYSTEM

TECHNICAL FIELD

The present invention relates to magnetic recording media capable of recording large volumes of information data, in particular, patterned media and magnetic recording media suitable for high-density recording, and a magnetic recording system using the same.

BACKGROUND ART

In recent years, compact, large-capacity magnetic disc apparatuses have been included in household electrical appliances as well as personal computers. Accordingly, demands for the increased capacity of magnetic recording systems are strong, and enhanced recording density is desired. To this end, the development of magnetic heads and magnetic recording media has been actively attempted. While improvement in surface recording density has heretofore been attempted, downsizing and even more remarkable improvement in recording density are demanded. Thus, discrete track media in which adjacent recording tracks are separated from each other with a trench or a non-magnetic material to suppress inter-track magnetic interferences (e.g., JP Patent Publication (Kokai) No. H07-85406 A (1995), FIG. 1), and patterned media in which adjacent recording bits are separated from each other with a trench or a non-magnetic material to suppress inter-bit magnetic interferences (e.g., JP Patent No. 3,286,291, paragraph [0025]) have been proposed.

Surface flatness is important for magnetic recording media in order to ensure flying stability of magnetic head. In the case of discrete track media or patterned media with high surface recording densities and small magnetic recording domains, surface flatness is particularly important. Thus, trenches between magnetic domains are filled with non-magnetic materials. In addition, a protective layer made of carbon-based materials is generally provided on a discrete media or patterned media recording layer so as to protect the recording layer and adsorb a lubricant, as in the case of conventional recording media. Among carbon-based materials, diamond-like carbon (hereafter referred to as "DLC") is amorphous and thus is excellent in surface smoothness, durability, and corrosion resistance. Thus, DLC is often utilized (e.g., JP Patent Publication (Kokai) No. 2006-120222 A, paragraph [0025]).

With respect to improvement in the reliability of discrete track media or patterned media, problems of corrosion resulting from damage imposed at the time of formation of concavities and convexities on a magnetic film via dry etching or other means and corrosion resulting from very small gaps or defects between magnetic domains and non-magnetic domains of a recording layer are apparent. An example of a conventional technique for improving corrosion resistance is selection of a combination of a material and a constitution of a seed layer, which is an upper layer of a soft magnetic underlayer in perpendicular magnetic recording media for which corrosion is the biggest problem (e.g., JP Patent Publication (Kokai) No. 2007-184019 A (FIG. 1)). Further, suppression of corrosion of magnetic domains via formation of a conductive layer between a recording layer and a protective layer of discrete track media or patterned media has been proposed (e.g., JP Patent Publication (Kokai) No. 2006-228282 A, paragraph [0051]).

DISCLOSURE OF THE INVENTION

Objects to be Attained by the Invention

Formation of a protective layer on the top of magnetic domains for the purpose of suppression of corrosion results in increased magnetic distance between a magnetic head and magnetic recording media, and it disadvantageously causes magnetic recording properties to deteriorate. When protective layer thickness is reduced in order to improve magnetic properties, however, it becomes difficult to attain satisfactory product performance in terms of corrosion resistance. That is, conventional anticorrosion techniques for magnetic domains of a magnetic recording layer were found to be incapable of simultaneously achieving sufficient magnetic recording properties and corrosion resistance.

The first object of the present invention is to provide magnetic recording media, in particular, discrete track media and patterned media that are excellent in magnetic recording properties and corrosion resistance.

The second object of the present invention is to provide a magnetic recording system that satisfactorily makes use of performance of such discrete media or patterned media.

Means for Attaining the Objects

It is important to impart corrosion resistance to a lubricant layer applied on a protective layer in order to attain the above objects, and such objects can be achieved by the two major means described below.

(1) A compound having effects of corrosion suppression on cobalt or a cobalt alloy is included with a lubricant in a lubricant layer to be applied on a protective layer of discrete track media or patterned media.

(2) A lubricant prepared by modifying at least one end of a lubricating compound with a functional group having effects of suppressing corrosion on cobalt or a cobalt alloy is applied.

Regarding the recording layer of the magnetic recording media, corrosion is the biggest problem for Co alloy used for magnetic domains. Co alloy is not excellent in corrosion resistance and it has a very low potential in an aqueous solution. Accordingly, Co alloy causes galvanic corrosion (i.e., bimetallic corrosion) between such alloy and an adjacent metal. In the case of a granular magnetic recording layer, Ru or an Ru alloy is formed as a underlying layer of the recording layer in order to accelerate segregation of oxides in the grain boundary of the recording layer. When Ru or an Ru alloy layer is brought into contact with the recording layer upon occurrence of processing damages in a concavity serving as a processing section of the recording layer, corrosion of Co alloy in the recording layer causes galvanic corrosion, and such corrosion takes place more rapidly than corrosion caused by Ru alone since Ru or an Ru alloy is a noble metal and exhibits very high potential. Discrete track media or patterned media are damaged at the time of formation of concavities and convexities on a magnetic film via dry etching or other means. Accordingly, corrosion in a magnetic domain is disadvantageously accelerated. In order to suppress corrosion in a magnetic domain serving as a recording layer at the processing site, an organic material exhibiting effects of corrosion suppression on cobalt or a cobalt alloy may be provided in a lubricant layer applied on a protective layer, so that corrosion caused by bimetallic contacts or corrosion caused by processing damage can be prevented. In such a case, the properties of the organic material to be selected are critical.

From the viewpoint of corrosion resistance, examples of required properties of an organic material provided on a magnetic domain of a recording layer at a processing site include:

(i) effects of corrosion suppression on Co or Co alloy;

(ii) a smooth, dense membrane with as few defects as possible; and (iii) a constitution that would not cause magnetic recording properties to deteriorate due to the increased magnetic distance between a magnetic head and magnetic recording media.

Also, such organic material should not influence the magnetic layer. This condition, however, is not a property of an organic material layer. While corrosion basically takes place in an aqueous system, acidification or alkalization caused by degradation of a lubricant, contamination with a chloride, or other problems may arise. Thus, corrosion resistance across a wide range of pH levels is required. Corrosion is particularly problematic at the boundary between the magnetic layer of a recording layer and the non-magnetic layer, and such region is considered to form gaps. In such region, accordingly, corrosion takes place in an acidic environment. Accordingly, corrosion resistance is particularly required in an acidic region.

Regarding (i) above, the present inventors have conducted various studies. As a result, they discovered that a layer of a compound having a heterocyclic ring typified by benzotriazole (BTA) would suppress corrosion of Co or Co alloy. Regarding the layer of a compound having a heterocyclic ring typified by benzotriazole, corrosion resistance is considered to be improved via strong bonds between hetero atoms in the heterocyclic ring and Co in the recording layer and via formation of a network between the heterocyclic rings.

Regarding (ii), a layer of a compound having a heterocyclic ring, such as benzotriazole, always comprises an atomically thin cobalt oxide layer naturally formed on the surface of Co or a Co alloy material. BTA molecules form strong coordination bonds with cobalt oxide, BTA molecules form covalent bonds with each other, and thus a strong BTA polymer layer is formed on the Co or Co alloy surface. Thus, a very dense coating without defects and excellent in terms of adhesive properties is formed.

Regarding (iii), the thickness of the lubricant layer to be applied should be regulated to several nm. Since BTA molecules are arranged in molecular order, corrosion can be suppressed without deterioration of magnetic recording properties due to the increased magnetic distance of the magnetic recording media.

Thus, corrosion resistance can be improved by imparting corrosion resistance to a lubricant layer to be applied on a protective layer.

Specifically, the present invention relates to magnetic recording media comprising a magnetic recording layer, a protective layer, and a lubricant layer provided on a nonmagnetic substrate, wherein the lubricant layer comprises a compound having a heterocyclic ring.

This description includes part or all of the contents as disclosed in the description and/or drawings of Japanese Patent Application No. 2010-156964, which is a priority document of the present application.

Effects of the Invention

The present invention can provide magnetic recording media with excellent corrosion resistance through the introduction of an organic material exhibiting effects of corrosion suppression on cobalt or a cobalt alloy into a lubricant layer to be applied on a protective layer on a magnetic recording layer.

BEST MODES FOR CARRYING OUT THE INVENTION

Hereafter, the present invention is described in detail.

The present invention relates to magnetic recording media comprising a magnetic recording layer, a protective layer, and a lubricant layer provided on a nonmagnetic substrate, wherein the lubricant layer comprises a compound having a heterocyclic ring.

The term "heterocyclic ring" used herein refers to a ring system containing hetero atom(s). Examples of hetero atoms include nitrogen, sulfur, oxygen, selenium, tellurium, phosphorus, and boron atoms. Preferable examples include nitrogen, sulfur, and oxygen atoms.

The number of hetero atoms contained as ring-member atoms of a heterocyclic ring is not particularly limited. A heterocyclic ring containing two or more hetero atoms is preferable because of its strong anti-corrosion effects. The number of the ring-member atoms of a heterocyclic ring is not particularly limited, and it is preferably 3 to 14, and particularly preferably 5 to 10.

The term "heterocyclic ring" used in the present invention refers to both an aromatic heterocyclic ring and an alicyclic heterocyclic ring. Condensed rings formed by a heterocyclic ring and a hydrocarbon ring are within the scope of the heterocyclic rings of the present invention. In addition, aromatic hydrocarbon rings and alicyclic hydrocarbon rings are within the scope of the hydrocarbon ring.

Examples of heterocyclic rings include, but are not limited to, pyrrole, imidazole, pyrazole, triazole, tetrazole, pyridine, pyridazine, pyrimidine, pyrazine, triazine, furan, oxazole, isoxazole, thiophene, thiazole, thiadiazole, piperidine, piperazine, morpholine, tetrahydrofuran, lactam, lactone, benzofuran, isobenzofuran, indole, isoindole, benzothiophene, purine, benzooxazole, benzothiazole, quinoline, isoquinoline, hydroquinoline, acridine, quinazoline, cinnoline, benzoimidazole, benzotriazole, coumarin, and pteridine. Aromatic heterocyclic rings are preferably used. Specifically, imidazole, triazole, tetrazole, thiadiazole, benzothiazole, and benzotriazole can be used.

A "heterocyclic ring" may or may not be substituted with a substituent. Examples of substituents include, but are not particularly limited to, alkyl (e.g., $C_1$-$C_6$ alkyl), nitro, carboxyl, sulfo, amino, mercapto, hydroxyl, and aryl (e.g., phenyl) groups.

The term "compound having a heterocyclic ring" used in the present invention includes a compound consisting of a heterocyclic ring that is not substituted or is substituted with a substituent (hereafter referred to as a "heterocyclic compound") (e.g., benzotriazole, tetrazole, or alkyl-substituted benzotriazole).

A further example of a "compound having a heterocyclic ring" is a compound having a heterocyclic ring at the end of a lubricant residue. The term "lubricant residue" used herein refers to a lubricating compound portion in a compound obtained by a bond between a lubricating compound and a heterocyclic compound. In the present invention, a variety of common lubricating compounds used in the field of the present invention can be used without particular limitation. Examples thereof include hydrocarbon lubricants, perfluoropolyether lubricants, and Fomblin lubricants. Perfluoropolyether lubricants are preferably used. Examples of perfluoropolyethers include perfluoromethylene oxide polymers, perfluoroethylene oxide polymers, perfluoro-n-propylene oxide polymers, perfluoroisopropylene oxide polymers, and copolymers of such polymers. The molecular weight of a perfluoropolyether is not particularly limited, and it is preferably between 1,000 and 4,000.

Examples include perfluoropolyether lubricants represented by the following formulae:

(1)

(2)

(3)

(4)

wherein R represents an alkyl group; p, q, and n are each independently 0 or a positive integer, and p, q, and n are each preferably an integer to bring the molecular weight of perfluoropolyether to 1,000 to 4,000.

A heterocyclic ring is preferably bound to the end of a lubricant residue. For example, use of a heterocyclic-ring-containing perfluoropolyether lubricant represented by the following formula is preferable:

wherein X and Y each independently represent a heterocyclic ring, (C$_1$-C$_6$)alkyl, fluorine, carboxyl, hydroxyl, or hydrogen, provided that either X or Y is a heterocyclic ring; L$_1$, L$_2$, and L$_3$ each independently represent a bifunctional group, such as (C$_1$-C$_6$)alkylene or (C$_1$-C$_6$) alkyleneoxy(C$_1$-C$_6$)alkylene; Cf is perfluoropolyether; Het is heterocyclic ring; and l, m, and n are each independently 0 or 1. More specifically, use of a heterocyclic-ring-containing perfluoropolyether lubricant represented by either of the following formulae is preferable:

(5)

(6)

wherein Het represents a heterocyclic ring, m and n are each independently 0 or a positive integer, and m and n are each preferably an integer to bring the molecular weight of the perfluoropolyether main chain to 1,000 to 4,000.

When a lubricant residue is not bound to a heterocyclic ring via a hetero atom of the heterocyclic ring; i.e., when a lubricant residue is bound to a heterocyclic ring via a carbon atom of the heterocyclic ring, high corrosion-suppressing effects can be attained. For example, use of a heterocyclic-ring-containing perfluoropolyether lubricant represented by the following formula is preferable.

(7)

By incorporating a compound having a heterocyclic ring into a lubricant layer, protective layer thickness can be reduced while corrosion resistance is maintained. This can decrease the magnetic distance between a magnetic head and magnetic recording media, thus improving magnetic properties. That is, high corrosion resistance and high magnetic properties can be simultaneously achieved according to the present invention.

A thinner protective layer is preferable from the viewpoint of magnetic properties. Thickness is not particularly limited, and it is preferably 10 nm or less and particularly preferably 2 nm or less. Materials constituting a protective layer are not particularly limited. Examples thereof include carbon, silica, alumina, titania, zirconia, cobalt oxide, nickel oxide, titanium nitride, silicon nitride, boron nitride, silicon carbide, chromium carbide, and boron carbide. Use of carbon is preferable in the present invention.

A compound comprising, for example, a nitrogen, sulfur, or oxygen atom having unpaired electrons can be used even if it does not have a heterocyclic ring. Such atoms may be used alone or in combinations of two or more.

According to an embodiment of the present invention, magnetic recording media comprise a lubricant layer comprising a compound having a heterocyclic ring (a heterocyclic compound, in particular) and a lubricating compound. According to this embodiment, a heterocyclic compound is different from a lubricating compound.

According to an embodiment of the present invention, magnetic recording media comprise a lubricant layer comprising a compound having a heterocyclic ring at the end of a lubricant residue. According to this embodiment, such compound functions not only as a lubricant but also as a corrosion suppressor.

According to an embodiment of the present invention, magnetic recording media comprise a lubricant layer comprising a compound having a heterocyclic ring (a heterocyclic compound, in particular) and a compound having a heterocyclic ring at the end of a lubricant residue. In some embodiments, the heterocyclic compound contains at least two hetero atoms as ring-member atoms. In combination or the alternative, the heterocyclic compound is substituted with an alkyl, nitro, carboxyl, sulfo, amino, mercapto, hydroxyl or aryl substituent.

The present invention also includes a perfluoropolyether derivative having a heterocyclic ring at the end. Preferably, the end is bound to a heterocyclic ring via a carbon atom of the heterocyclic ring in such derivative. A perfluoropolyether derivative having a heterocyclic ring at the end can be used as a lubricant and corrosion suppressor.

Further, the present invention includes a magnetic recording system comprising: magnetic recording media; a drive section for driving the magnetic recording media in the recording direction; a magnetic head comprising a recording section and a playing section; a means for driving the magnetic head relative to the magnetic recording media; and a signal processing means for waveform processing of the signals inputted into and outputted from the magnetic head. With the use of the magnetic recording system of the present invention, a recording density of 95 gigabits or higher per square centimeter can be achieved.

Figure 1:
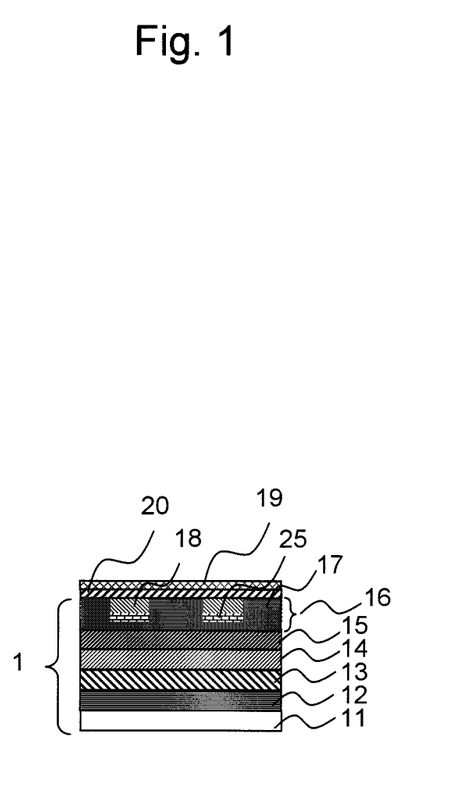
FIG. 1 schematically shows a cross-sectional structure of a magnetic recording medium.

FIG. 1 shows a cross-section of a magnetic disc structure of the basic patterned medium of the present invention. The medium comprises a glass disc substrate 11 and, provided thereon, an adhesion layer 12, a soft magnetic underlayer 13, a seed layer 14, an intermediate layer 15, and a recording layer 16. The recording layer 16 has concavity and convexity, a convex portion is a magnetic domain 17, and a concave portion is a nonmagnetic domain 18. A protective layer 20 is provided on the recording layer. A lubricant layer 19 is provided (coated) thereon.

Materials constituting an adhesion layer are not particularly limited, provided that such materials are excellent in terms of substrate adhesiveness and surface flatness. It is preferable that an adhesion layer is constituted by an alloy comprising at least two types of metals selected from among Ni, Al, Ti, Ta, Cr, Zr, Co, Hf, Si, and B. More specifically, NiTa, AlTi, AlTa, CrTi, CoTi, NiTaZr, NiCrZr, CrTiAl, CrTiTa, CoTiNi, CoTiAl, or the like can be used.

Materials constituting a soft magnetic underlayer are not particularly limited, provided that saturation flux density (Bs) is at least 1 tesla, uniaxial anisotropy is imparted in a radial direction of the disc substrate, magnetic coercive force measured in the running direction of the head is 1.6 kA/m or less, and surface flatness is excellent. More specifically, such properties can be easily attained using an amorphous alloy comprising Co, Ni, or Fe as a main component and Ta, Hf, Nb, Zr, Si, B, C, or the like added thereto. Further, a nonmagnetic layer may be inserted into a soft magnetic underlayer to form a laminate structure, so that a noise can be reduced. Use of a CoCr alloy, Ru, Cr, Cu, MgO, or the like as a material for such nonmagnetic layer is preferable.

A seed layer is used to regulate the orientation of an intermediate layer and crystal grain sizes, and an fcc alloy comprising, as a main component, Ni can be used. Examples of representative alloys that can be used include alloys comprising Ni and at least one member selected from among W, Fe, Ta, Ti, Ta, Nb, Cr, Mo, V, Cu, and the like. In order to improve corrosion resistance, a seed layer may have a bilaminar structure, the seed layer is used for the recording layer side (i.e., the second seed layer), and the first seed layer composed of an alloy of Cr and Ta, Ti, Nb, or Al may be inserted between the second seed layer and the soft magnetic layer.

As an intermediate layer, Ru alone or alloys having the hexagonal close packed lattice (hcp) or fcc structure and mainly composed of Ru can be used.

As a material for a magnetic layer provided in the convex portion of the recording layer, a granular alloy comprising CoCr (e.g., CoCrPt), FePt, or other materials as a main component and an oxide (e.g., $SiO_2$) added thereto can be used. Specific examples thereof include $CoCrPt-SiO_2$, $CoCrPt-MgO$, and $CoCrPt-TaO$. As a nonmagnetic material used for the concave portion, an oxide such as $SiO_2$, $Al_2O_3$, $TiO_2$, or ferrite, a nitride such as AlN, and a carbide such as SiC, can be used. As Co and Pt concentrations, a Cr concentration is preferably 15 to 25 at. % and more preferably 10 to 20 at. %. A protective layer B provided at the bottom of a magnetic substance is a layer that is introduced so as to repair defects caused by damage imposed when processing a magnetic layer. It is constituted by a layer of a passive metal, an alloy thereof, or carbon. Examples of passive metals that can be used include Cr, Ti, Ni, Mo, Nb, W, Ta, Zr, and alloys containing at least one such metal. An alloy containing Cr is particularly preferable. A material of a protective layer C provided on the recording layer is a hard carbon layer represented by diamond-like carbon or the like. Further, a lubricant layer is provided on the protective layer, although it is not shown in FIG. 1.

A method for producing magnetic recording media is described with reference to FIG. 2. Basically, magnetic recording media were prepared using a sputtering apparatus (model: C3010, ANELVA). This sputtering apparatus is constituted by 10 process chambers and a substrate introduction chamber, and such chambers are independently exhausted. The exhaustion capacity of all the chambers is $6 \times 10^{-6}$ Pa or lower. As shown in FIG. 2(A), a glass substrate having a diameter of 63.5 mm was used as a substrate 11. An adhesion layer 12, a soft magnetic underlayer 13, a seed layer 14, an intermediate layer 15, and a recording layer (a magnetic domain) 17 were successively prepared via sputtering. Representative compositions and layer thicknesses are as shown in Table 1. Compositions and layer thicknesses shown in Table 1 are merely representative examples, and the same results can be attained with the use of different compositions or layer thicknesses. When $Cr_{50}Ti_{50}$ is used as the first seed layer and $Ni_{90}Ti_{10}$ is used as the second seed layer, a NiWTa seed layer is used instead of a double seed layer, or CoCrPt—TaO is used for the recording layer, for example, similar results can be attained.

TABLE 1

| | | Target composition (at. %) | Layer thickness (nm) |
|---|---|---|---|
| Adhesion layer | | $Ni_{63}Ta_{37}$ | 10 |
| Soft magnetic underlayer | First soft magnetic layer | $Co_{92}Ta_3Zr_5$ | 50 |
| | Nonmagnetic layer | Ru | 0.8 |
| | Second soft magnetic layer | $Co_{92}Ta_3Zr_5$ | 50 |
| Seed layer | First seed layer | $Ta_{70}Cr_{30}$ | 2 |
| | Second seed layer | $Ni_{92}W_8$ | 5 |
| Intermediate layer | | Ru | 16 |
| Recording layer | | $CoCrPt-SiO_2$ | 16 (maximum) |

Figure 2:
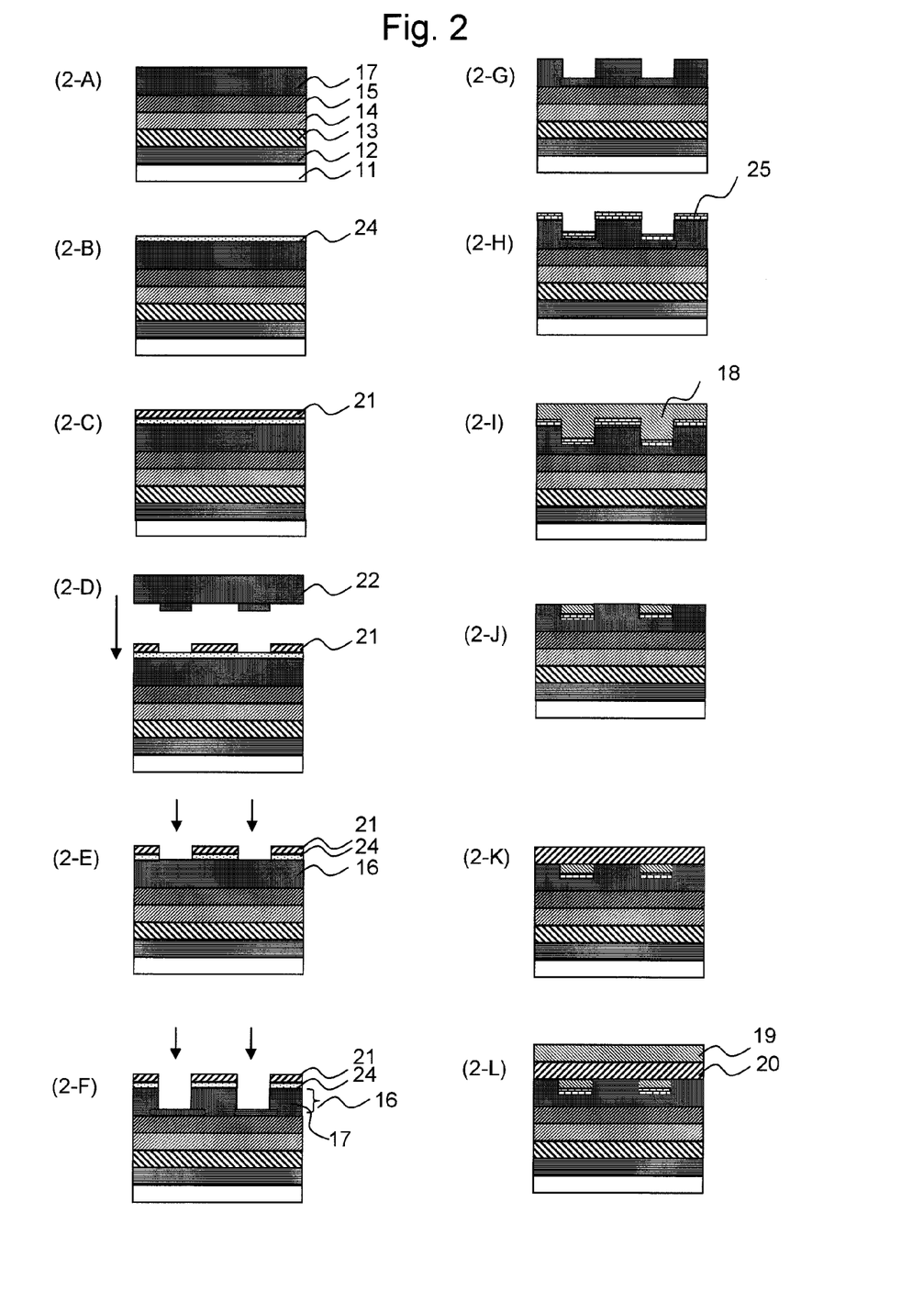
FIG. 2 shows a method for producing a magnetic recording medium.

Subsequently, a protective layer A 24 is provided on a magnetic domain 17 of the recording layer, and a resist 21 is applied on the protective layer A 24 via spin coating, as shown in FIGS. 2 (2-B) and (2-C). A positive resist or the like is used as a material for a resist layer. The protective layer A 24 is provided for the purpose of preventing the recording layer (a magnetic domain) 17 from becoming corroded in the process of forming a discrete track via coating of the resist 21. Subsequently, a concave-convex pattern with given intervals equivalent to the servo pattern in the servo domain and the track pattern in the data domain is transcribed via nanoimprinting into the resist layer using a transcription apparatus, as shown in FIG. 2 (2-D). Subsequently, a protective layer A 24 is removed from a resist removing section via reactive ion beam etching.

Further, part of the magnetic domain 17 of the recording layer is removed via ion milling to provide a concave portion, as shown in FIG. 2 (2-F). In this case, such part may reach the intermediate layer under the recording layer, as shown in FIG. 2 (2-G). Subsequently, the protective layer and the resist layer are removed (FIG. 2 (2-G)) and a protective layer B 25 is provided with the use of a carbon layer or a passive metal via sputtering, as shown in FIG. 2 (2-H). A nonmagnetic substance 18 is then applied, via sputtering, to the surface of a non-processed region to a thickness somewhat larger than that of the concave portion to fill the same, as shown in FIG. 2 (2-I). An excess filling layer 18 (a nonmagnetic domain) and the protective layer B 25 (above the magnetic domain of the recording layer) are removed via etching (e.g., the CMP method) as shown in FIG. 2 (2-J), and concavities and convexities on the media surface generated during the processes shown in FIG. 2 (2-D) to (2-I) are then smoothened. Subsequently, a protective layer C 20 is provided on the smoothened surface using the CVD method, and a liquid lubricant layer 19 is then applied to the protective layer C, as shown in FIG. 2 (2-K).

A lubricant layer may be prepared by applying a solution of a given amount of a lubricating compound and a heterocyclic-ring-containing compound (e.g., a heterocyclic compound or a novel lubricant represented by formula 5 or 6) in a volatile organic solvent, such as hydrofluoroether, to the disc shown in FIG. 2-K via wire bar coating, gravure coating, spin coating, dip coating, or another technique. Alternatively, such solution may be deposited on the disc via vacuum deposition. Thus, recording media shown in FIG. 1 can be obtained.

EXAMPLES

Corrosion resistance was evaluated in the following manner. At the outset, samples were allowed to stand under hot and humid conditions at a temperature of 60° C. and relative humidity (RH) of 90% or higher for 96 hours. Subsequently, corrosion points between the radius 14 mm and the radius 25 mm were counted using an optical surface analyzer and graded as described below. Samples exhibiting fewer than 50 corrosion points were graded "A," those exhibiting 50 or more and less than 200 were graded "B," those exhibiting 200 to less than 500 were graded "C," and those exhibiting 500 or more were graded "D." From the viewpoint of practical use, samples graded "B" or higher are preferable. Hereafter, specific examples of the present invention are described with reference to tables and figures.

Example 1

In Example 1, the recording medium having the layer structure shown in FIG. 1 and Table 1 was used. A protective layer C was a 2-nm-thick carbon layer. $SiO_2$ was used as a filler. A lubricant layer was provided on a disc in the state shown in FIG. 2 (2-K). A solution used for preparing a lubricant layer was prepared by dissolving perfluoropolyether represented by formula 1 and benzotriazole in hydrofluoroether (HFE-7100, Sumitomo 3M Ltd.), the resulting solution was applied to the recording medium via dipping, and the total thickness of the lubricant layer and the BTA layer after HFE had been evaporated in the end was adjusted to approximately 2 nm. The ratio of HFE-7100 to BTA by weight was adjusted to 1:0.0002. Since BTA would not dissolve in HFE, BTA was dissolved in a very small amount of ethanol in advance, and the resultant was then dissolved in HFE. Corrosion resistance of the medium (sample 1-1) and S/N of the medium shown in FIG. 2 (2-L) were inspected in the end. As a result, high S/N of 18 dB or higher and excellent corrosion resistance of grade A were attained.

Example 2

Subsequently, a sample was prepared by dissolving a different type of a heterocyclic compound in HFE with a lubricant, and the S/N ratio and corrosion resistance of the media were evaluated in the same manner. The results are shown in Table 2.

TABLE 2

| Sample | Heterocyclic compound to be mixed with lubricant | Corrosion resistance grade |
|---|---|---|
| 2-1 | Without treatment | D |
| 2-2 | 1-(2',3'-Dihydroxypropyl)-benzotriazole | A |
| 2-3 | 1,2,3-Triazole | A |
| 2-4 | Nitro-1H-benzotriazole | A |
| 2-5 | 5-Methyl-benzotriazole | A |
| 2-6 | Carboxy benzotriazole | A |
| 2-7 | 1,2,3,4-Tetrazole | A |
| 2-8 | 5-Amino-1,2,3,4-tetrazole | A |
| 2-9 | 5-Phenyl-1,3,4-thiadiazol-2-ol | A |
| 2-10 | Mercaptobenzothiazole | A |

All samples exhibited excellent corrosion resistance. The S/N ratio of the media were satisfactorily 18 dB or higher.

Example 3

In Example 3, the recording medium having the layer structure shown in FIG. 1 and Table 1 was used. A protective layer C was a 2-nm-thick carbon layer. $SiO_2$ was used as a filler. A lubricant layer was provided on a disc in the state shown in FIG. 2 (2-K). A solution used for preparing a lubricant layer was prepared by dissolving a perfluoropolyether derivative represented by formula 7 in hydrofluoroether (HFE-7100, Sumitomo 3M Ltd.), this solution was applied to the recording medium via dipping, and the thickness of the lubricant layer after HFE had been evaporated in the end was adjusted to approximately 2 nm. Corrosion resistance of the medium (sample 1-1) and S/N of the medium shown in FIG. 2 (2-L) were inspected in the end. As a result, S/N of 18 dB or higher and excellent corrosion resistance of grade A were attained.

Example 4

In Example 4, corrosion resistance of the samples prepared by replacing the benzotriazole portion of the lubricant represented by formula 7 with imidazole (4-1), triazole (4-2), and tetrazole (4-3) was demonstrated. The lubricant layer was prepared in the same manner as in Example 3. Corrosion resistance of the media (sample 1-1) and S/N of the media shown in FIG. 2 (2-L) were inspected in the end. As a result, in each sample, S/N of 18 dB or higher and excellent corrosion resistance of grade A were attained.

TABLE 3

| Sample | Perfluoropolyether derivative exhibiting effects of suppressing corrosion | Corrosion resistance grade |
|---|---|---|
| 2-1 | Without treatment | D |
| 4-1 | ![pyrazole]—CH$_2$OCH$_2$—CF$_2$O(CF$_2$CF$_2$O)$_m$(CF$_2$O)$_n$CF$_2$—CH$_2$OCH$_2$—[pyrazole] | A |
| 4-2 | [triazole]—CH$_2$OCH$_2$—CF$_2$O(CF$_2$CF$_2$O)$_m$(CF$_2$O)$_n$CF$_2$—CH$_2$OCH$_2$—[triazole] | A |
| 4-3 | [tetrazole]—CH$_2$OCH$_2$—CF$_2$O(CF$_2$CF$_2$O)$_m$(CF$_2$O)$_n$CF$_2$—CH$_2$OCH$_2$—[tetrazole] | A |

Example 5

In Example 5, the recording medium having the layer structure shown in FIG. 1 and Table 1 was used. A protective layer C was a 2-nm-thick carbon layer. SiO$_2$ was used as a filler. A lubricant layer was provided on a disc in the state shown in FIG. 2 (2-K). A solution used for preparing a lubricant layer was prepared by dissolving a perfluoropolyether derivative represented by formula 8 in hydrofluoroether (HFE-7100, Sumitomo 3M Ltd.), this solution was applied to the recording medium via dipping, and the thickness of the lubricant layer after HFE had been evaporated in the end was adjusted to approximately 2 nm. Corrosion resistance of the medium (sample 1-1) and S/N of the medium shown in FIG. 2 (2-L) were inspected in the end. As a result, S/N of 18 dB or higher and excellent corrosion resistance of grade B were attained.

Since the BTA is bound to the main chain of hydrofluoroether via a hetero atom, the adhesiveness and the regulation of the network structure of such sample are poorer than in the case of the compound having the structure represented by formula 7. Thus, the corrosion resistance grade thereof is somewhat lower.

—CH$_2$OCH$_2$—CF$_2$O(CF$_2$CF$_2$O)$_m$(CF$_2$O)$_n$CF$_2$—CH$_2$OCH$_2$—

(8)

Example 6

In Example 6, the recording medium having the layer structure shown in FIG. 1 and Table 1 was used. A protective layer C was a 2-nm-thick carbon layer. SiO$_2$ was used as a filler. A lubricant layer was disposed on a disc in the state shown in FIG. 2 (2-K). The solution used for preparing a lubricant layer was prepared by dissolving a perfluoropolyether derivative represented by formula 7 and benzotriazole in hydrofluoroether (HFE-7100, Sumitomo 3M Ltd.), this solution was applied to the recording medium via dipping, and the thickness of the lubricant layer after HFE had been evaporated in the end was adjusted to approximately 2 nm. The ratio of HFE-7100 to BTA by weight was adjusted to 1:0.0002. Since BTA would not dissolve in HFE, BTA was dissolved in a very small amount of ethanol in advance, and the resultant was then dissolved in HFE. Corrosion resistance of the medium (sample 1-1) and S/N of the medium shown in FIG. 2 (2-L) were inspected in the end. As a result, high S/N of 18 dB or higher and excellent corrosion resistance of grade A were attained.

Example 7

Figure 3:
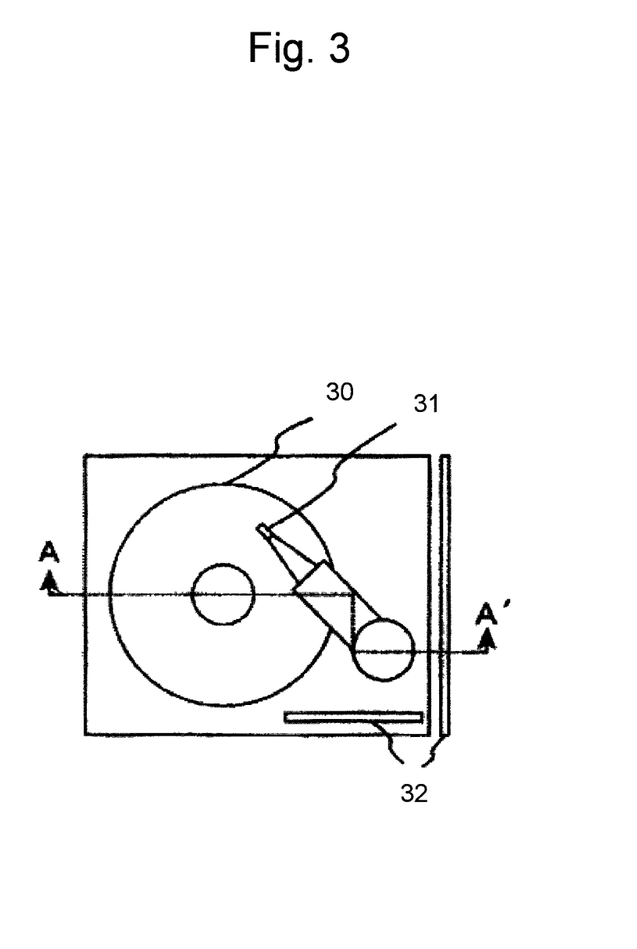
FIG. 3 schematically shows an overhead view of a magnetic recording system.
Figure 4:
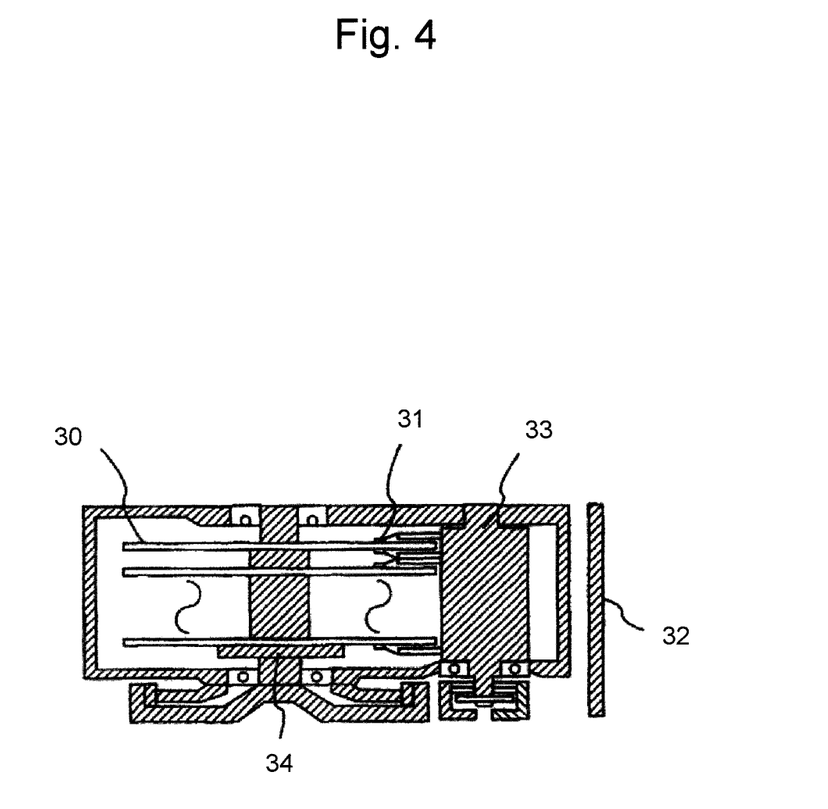
FIG. 4 shows a cross section of a magnetic recording system.

FIG. 3 schematically shows a magnetic recording system including various media described in the examples above. FIG. 4 shows a cross section taken at A-A' shown in FIG. 3. The housing comprises the patterned media described in this example, a drive mechanism that rotates the media, a magnetic head equipped with a recording/playing section, a drive means that moves the magnetic head relative to the patterned media, and a recorded/played signal processing means that processes the signal inputted into the magnetic head and the signal outputted from the magnetic head. The magnetic head is a composite-type magnetic head, which includes a recording head with a trailing shield and a playing head using a shielded MR playing element (e.g., a GMR or TMR film).

The magnetic recording system comprises a magnetic recording medium excellent in corrosion resistance and a magnetic head with a steep magnetic-field gradient. This can allow excellent corrosion resistance.

Comparative Example 1

In Comparative Example 1, a sample comprising a carbon protective layer C and a lubricant layer containing no functional group that would exhibit effects of corrosion suppression on cobalt or a cobalt alloy was evaluated (sample 2-1). As a result, the corrosion resistance grade of such sample was found to be D, which was very poor.

Comparative Example 2

In Comparative Example 2, cases involving the use of compounds containing hetero atoms other than a compound having a heterocyclic ring were demonstrated. Basic composition and layer thickness are the same as those employed in Example 1. As shown in Table 4, the corrosion resistance grades of all samples were D, which was very poor.

TABLE 4

| Sample | Compound to be mixed with lubricant | Corrosion resistance grade |
| --- | --- | --- |
| 9-1 | Ethylenediamine | D |
| 9-2 | Glycine | D |
| 9-3 | Thiourea | D |
| 9-4 | Cysteine | D |

All publications, patents, and patent applications cited herein are incorporated herein by reference in their entirety.

DESCRIPTION OF NUMERAL REFERENCES

1: Magnetic recording medium
11: Substrate
12: Adhesion layer
13: Soft magnetic underlayer
14: Seed layer
15: Intermediate layer
16: Recording layer
17: Magnetic domain
18: Filler domain
19: Lubricant layer
20: Protective layer C
21: Resist
22: Stamper
30: Patterned medium
31: Magnetic head
32: Recorded/played signal processing means
33: Drive means
34: Drive section

The invention claimed is:

1. A magnetic recording medium comprising a magnetic recording layer, a protective layer and a lubricant layer provided on a nonmagnetic substrate, wherein the lubricant layer comprises a first compound having a heterocyclic ring, wherein the first compound having a heterocyclic ring comprises a lubricant residue having a first end and a second end, a heterocyclic ring at the first end of the lubricant residue and a heterocyclic ring at the second end of the lubricant residue.

2. The magnetic recording medium according to claim 1, wherein the lubricant layer further comprises a second compound having a heterocyclic ring.

3. The magnetic recording medium according to claim 2, wherein the second compound having a heterocyclic ring is a heterocyclic compound.

4. The magnetic recording medium according to claim 2, wherein the heterocyclic ring of the second compound having a heterocyclic ring comprises at least 2 hetero atoms ring-members atoms.

5. The magnetic recording medium according to claim 2, wherein the heterocyclic ring of the second compound having a heterocyclic ring comprises is substituted with a substituent selected from the group consisting of alkyl, nitro, carboxyl, sulfo, amino, mercapto, hydroxyl, and aryl groups.

6. The magnetic recording medium according to claim 1, wherein the first end of the lubricant residue is bounded to the heterocyclic ring at the first end of the lubricant residue via a carbon atom of the heterocyclic ring at the first end of the lubricant residue, and wherein the second end of the lubricant residue is bounded to the heterocyclic ring at the second end of the lubricant residue via a carbon atom of the heterocyclic ring at the second end of the lubricant residue.

7. The magnetic recording medium according to claim 1, wherein the lubricant residue has a perfluoropolyether group.

8. The magnetic recording medium according to claim 1, wherein the heterocyclic ring at the first end of the lubricant residue comprises at least 2 hetero atoms as ring-member atoms.

9. A magnetic recording system comprising:
the magnetic recording medium according to claim 1;
a drive section for driving the magnetic recording media in a recording direction;
a magnetic head comprising a recording section and a playing section;
a means for driving the magnetic head relative to the magnetic recording media; and
a signal processing means for waveform processing of a signal inputted into and a signal outputted from the magnetic head.

10. The magnetic recording medium according to claim 1, wherein the heterocyclic ring at the first end of the lubricant residue is condensed with a hydrocarbon ring.

11. The magnetic recording medium according to claim 10, wherein the heterocyclic ring at the first end of the lubricant residue is condensed with an aromatic hydrocarbon ring.

12. The magnetic recording medium according to claim 1, wherein the heterocyclic ring at the first end of the lubricant residue is benzotriazole.

13. The magnetic recording medium according to claim 1, wherein the heterocyclic ring at the first end of the lubricant is selected from the group consisting a non-substituted heterocyclic ring, an alkyl substituted heterocyclic ring, a nitro substituted heterocyclic ring, a carboxyl substituted heterocyclic ring, a sulfo substituted heterocyclic ring, an amino substituted heterocyclic ring, a mercapto substituted heterocyclic ring, a hydroxyl substituted heterocyclic ring, and an aryl substituted heterocyclic ring, and
wherein the heterocyclic ring at the second end of the lubricant is selected from the group consisting a non-substituted heterocyclic ring, an alkyl substituted heterocyclic ring, a nitro substituted heterocyclic ring, a carboxyl substituted heterocyclic ring, a sulfo substituted heterocyclic ring, an amino substituted heterocyclic ring, a mercapto substituted heterocyclic ring, a hydroxyl substituted heterocyclic ring, and an aryl substituted heterocyclic ring.

14. A perfluoropolyether derivate having a heterocyclic rings at both of its ends represented by the formula:

wherein $L_1$ and $L_2$ each independently represent a bifunctional group;
l and m are each independently 0 or 1;
Cf is perfluoropolyether, and
wherein X and Y represent a heterocyclic ring.

15. The perfluoropolyether derivative according to claim 14, wherein X and Y are both bound via a carbon atom of their respective heterocyclic rings.

16. A lubricant, comprising the perfluoropolyether derivative according to claim 14.

17. The perfluoropolyether derivate of claim 14, wherein
X is a heterocyclic ring selected from the group consisting a non-substituted heterocyclic ring, an alkyl substituted heterocyclic ring, a nitro substituted heterocyclic ring, a carboxyl substituted heterocyclic ring, a sulfo substituted heterocyclic ring, an amino substituted heterocyclic ring, a mercapto substituted heterocyclic ring, a hydroxyl substituted heterocyclic ring, and an aryl substituted heterocyclic ring, and
Y is a heterocyclic ring selected from the group consisting of a non-substituted heterocyclic ring, an alkyl substituted heterocyclic ring, a nitro substituted heterocyclic ring, a carboxyl substituted heterocyclic ring, a sulfo substituted heterocyclic ring, an amino substituted heterocyclic ring, a mercapto substituted heterocyclic ring, a hydroxyl substituted heterocyclic ring, and an aryl substituted heterocyclic ring.

\* \* \* \* \*